United States Patent [19]
Mitchell et al.

[11] Patent Number: 6,141,883
[45] Date of Patent: Nov. 7, 2000

[54] APPARATUS FOR DETECTING THE THICKNESS OF DOCUMENTS

[75] Inventors: Paul Mitchell, Hilltop; Erick Christopher Grasmueck, Mt. Laurel, both of N.J.

[73] Assignee: Opex Corporation, Moorestown, N.J.

[21] Appl. No.: 09/140,236

[22] Filed: Aug. 26, 1998

[51] Int. Cl.[7] .............................. G01B 3/00; B65H 5/02
[52] U.S. Cl. ................................. 33/501.02; 33/501.03; 271/274
[58] Field of Search ........................... 33/501.02, 501.03, 33/501.04, 783, 784, 791–793; 271/274, 272, 273

[56] References Cited

U.S. PATENT DOCUMENTS

| | | | |
|---|---|---|---|
| 2,659,154 | 11/1953 | Rendel | 33/501.02 |
| 3,665,743 | 5/1972 | Frohling | 33/501.03 |
| 5,659,968 | 8/1997 | Leifeld | 33/501.02 |
| 5,762,332 | 6/1998 | Haroutel et al. | 271/274 |
| 5,971,392 | 10/1999 | Lee | 271/265.02 |

FOREIGN PATENT DOCUMENTS

| | | | |
|---|---|---|---|
| 0 655 978 | 6/1996 | European Pat. Off. | |
| 72801 | 6/1980 | Japan | 33/501.02 |
| 18401 | 1/1984 | Japan | 33/501.02 |
| 131002 | 6/1988 | Japan | 33/501.02 |
| 2084735 | 4/1982 | United Kingdom | 33/501.02 |

*Primary Examiner*—Christopher W. Fulton
*Assistant Examiner*—Quyen Doan
*Attorney, Agent, or Firm*—Dann, Dorfman, Herrell and Skillman; Stephen H. Eland

[57] ABSTRACT

A thickness detector is provided for detecting the thickness of envelopes containing documents. The thickness detector detects the thickness of the envelopes at a plurality of points along the length of the envelopes as the envelopes are conveyed along a transport path. The thickness detector includes a fixed roller and a follower roller forming a nip. The follower roller is rotatably mounted on a follower arm that is pivotable relative to the fixed roller. A semi-rigid connecting rod connects the follower arm to a damper that dampens the reciprocal movement of the follower arm.

21 Claims, 1 Drawing Sheet

6,141,883

APPARATUS FOR DETECTING THE THICKNESS OF DOCUMENTS

FIELD OF THE INVENTION

The present invention relates to an apparatus for detecting the thickness of mail. More specifically, the present invention relates to an apparatus for detecting the thickness of envelopes containing documents as the envelopes are conveyed along a path of movement.

BACKGROUND OF THE INVENTION

Thickness detectors are well-known in the art of high-speed document processing. For instance, in the field of high-speed automated mail processing, thickness detectors are utilized to detect the thickness of the envelopes being processed. Typically, a batch of mail is placed in an input bin and the envelopes are serially fed from the input bin along a transport path. A thickness detector positioned along a transport path detects the thickness of each envelope. Further processing of an envelope is controlled by the thickness of the envelope measured by the thickness detector. For instance, if an envelope has a thickness that is greater than a predetermined threshold, the envelope is outsorted and processed separately from the envelopes having a thickness below the threshold.

The accuracy, reliability and durability of the known thickness detectors decreases as the speed of the transport conveying the mail is increased. Accordingly, the present invention provides an accurate, durable and reliable thickness detector capable of processing documents being transported at high speeds.

SUMMARY OF THE INVENTION

In light of the foregoing, the present invention provides a device for detecting the thickness of mail being conveyed along a transport path. The device includes a thickness detector positioned along the transport path for detecting the thickness of the mail as the mail is conveyed along the transport path. The device includes a damper for dampening the motion of the thickness detector. A longitudinally elongated connecting rod connects the thickness detector and the damper. The first end of the connecting rod is connected to the thickness detector and the second end of the connecting rod is connected to the damper. The connecting rod is laterally resiliently flexible and sufficiently stiff longitudinally so that displacement of the first end displaces the second end.

DESCRIPTION OF THE DRAWINGS

The foregoing summary as well as the following detailed description of the preferred embodiment of the present invention will be better understood when read in conjunction with the appended drawing, in which.

DETAILED DESCRIPTION OF THE PREFERRED EMBODIMENTS

Figure 1:
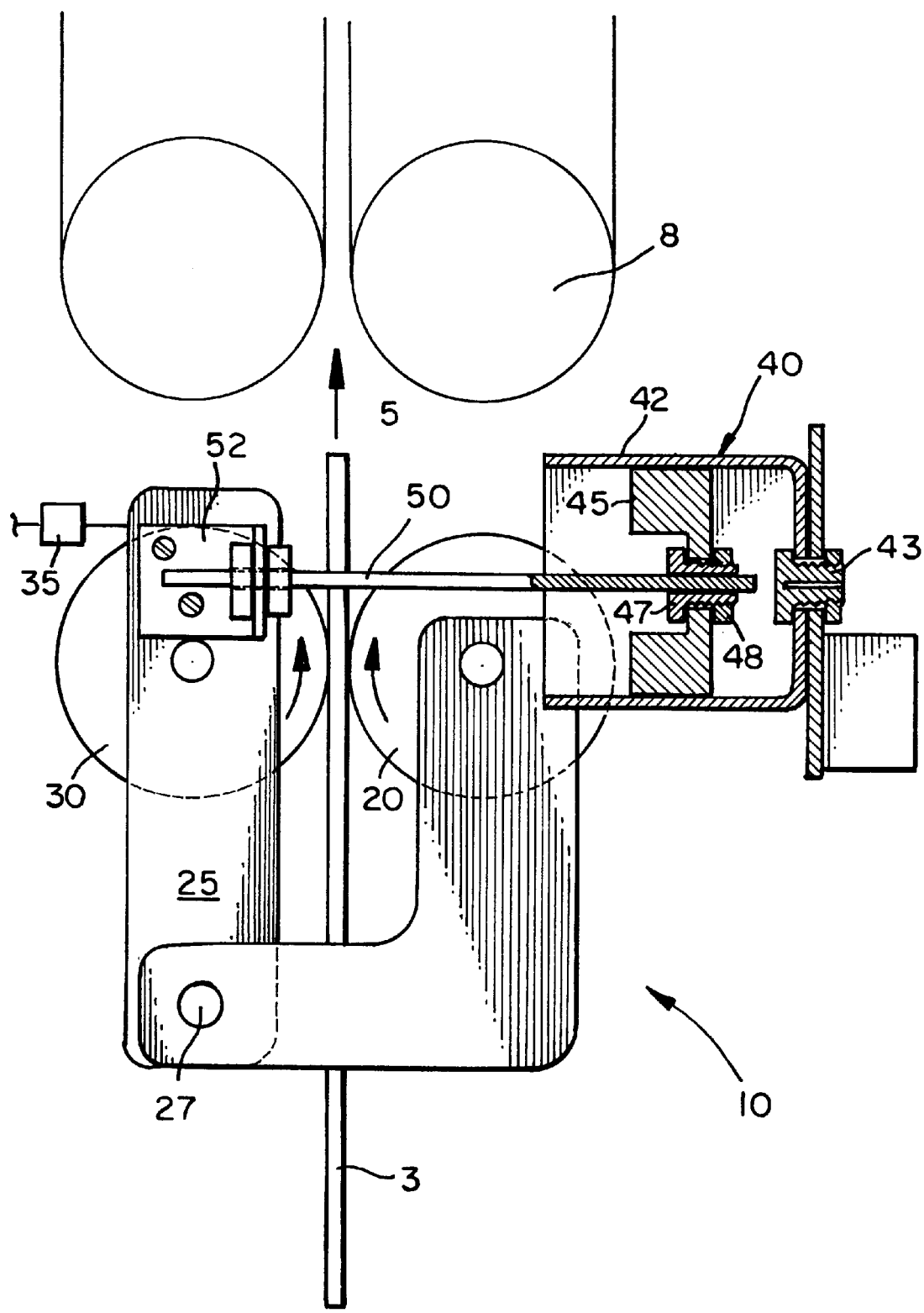
FIG. 1 is a top plan view partially in section of a thickness detector according to the present invention.

Referring to FIG. 1, a thickness detector according to the present invention is designated generally 10. Preferably, the thickness detector 10 is incorporated into an automated mail processing apparatus for processing envelopes containing documents. In the present instance, the thickness detector processes envelopes containing one or more documents. However, the thickness detector is generally operable to process paper items and sheet materials, such as checks, invoices and other documents. Accordingly, in the following description the term mail includes envelopes containing documents, as well as sheet materials in general, such as checks invoices and other documents.

A conveyor 8 serially conveys the mail 3 along a transport path 5 to the thickness detector 10. The conveyor 8 comprises opposing belts entrained about pulleys and the mail is conveyed between the opposing belts. The thickness detector 10 detects the thickness of each piece of mail 3 at one or more points along the length of the pieces as the pieces are conveyed along the transport path 5. The mail processing apparatus then controls the continued processing of the envelopes in response to the thickness detected for each envelope. For instance, an envelope having a thickness that is greater than a predetermined threshold is outsorted and processed separately from envelopes having a thickness below the threshold.

The thickness detector comprises a pair of rollers 20, 30 forming a nip for receiving the mail. The first roller 20 is mounted in a fixed position relative to the transport path. A motor drives the fixed roller 20. The second roller 30 is an idler roller rotatably mounted on a pivotable follower arm 25 that is biased toward the fixed roller 20. Accordingly, when there is no mail in the transport path 5 at the thickness detector 10, the follower roller 30 is pivoted into contact with the fixed roller 20. As a piece of mail enters the nip formed between the driving roller 20 and the follower roller 30, the mail forces the follower roller away from the fixed roller 20 so that the fixed roller engages one face of the mail and the follower roller engages the opposite face of the mail. As the mail is conveyed between the rollers 20, 30 the follower arm 25 pivots about pivot axis 27 in response to the change in thickness along the length of the mail.

The follower arm 25 is coupled with a device for converting mechanical movement of the follower arm into electrical signals for further processing. In the present instance, a linear variable differential transformer (LVDT) 35 is utilized. The output from the LVDT 35 is indicative of the position of the follower roller. Since the position of the fixed roller 20 is fixed, the output from the LVDT 35 which is indicative of the position of the follower roll 30, is also indicative of the thickness of the mail between the fixed roller and the follower roller. Other indicators can be utilized to determine the position of the follower arm and the thickness of the mail. For instance, a strain gauge can be used in place of the LVDT.

Typically, the thickness of a piece of mail varies along the length of the piece. For instance, an envelope containing a check and an invoice is typically thinner at the leading edge and the trailing edge of the envelope because the check and invoice are not usually coextensive with the length of the envelope. Accordingly, the thickness detector 10 detects the thickness of each envelope at a plurality of points along the length of each envelope to determine the maximum and minimum thickness of the envelope and its contents.

Preferably, the mail is conveyed along the transport path 5 at a high rate, such as 40,000 pieces/hour. Since the mail is moving at a high rate through the thickness detector, the follower arm 25 moves inwardly and outwardly rapidly in response to the entrance and exit of the mail and the variations in thickness of the pieces of mail. The rapid radial movement of the follower arm 25 can cause the follower arm to bounce thereby causing false thickness readings. To reduce the bounce, the follower arm 25 is connected to a damper 40.

The damper 40 is a dashpot having a piston 45 that reciprocates linearly within a cylinder 42. A connecting rod 50 connects the follower arm 25 and the piston 45. The connecting rod 50 is fixedly connected to both the follower arm 25 and the piston 45. In the present instance, the connecting rod is attached to the piston 45 by an externally threaded sleeve 47 that circumscribes a portion of the connecting rod 50 adjacent one end of the connecting rod. The sleeve 47 is bonded to the connecting rod. The sleeve 47 has an enlarged head that bears against one side of the piston 45. The sleeve extends through an opening in the piston 45 and a nut 48 engages the sleeve 47 to connect the sleeve to the piston. The opposite end of the connecting rod 50 is similarly fixedly attached to an L-shaped mounting bracket 52 that is connected to the follower arm 25.

The dashpot cylinder 42 has a generally open end for receiving the piston 45 and a generally closed end. The piston 45 forms a fluid-tight seal with the side walls of the cylinder 42 so that an enclosed space is formed between the piston and the generally closed end of the cylinder. An adjustment valve 43 in the closed end of the cylinder 42 controls the flow of air into the enclosed space formed between the piston 45 and the closed end of the cylinder, thereby controlling the dampening effect of the dashpot 40.

As envelopes are transported through the thickness detector 10, the follower arm 25 pivots reciprocally as it engages and disengages each piece of mail. The reciprocal motion of the follower arm is transmitted to the piston 45 by the connecting rod 50 so that the piston 45 reciprocates within the cylinder 42 as the follower arm 25 is displaced. Since the follower arm 25 pivots about pivot axis 27, the reciprocal displacement of the follower arm is a radial displacement. However, the cylinder 42 constrains the piston 45 to linear displacement. Accordingly, to prevent the piston 45 from binding within the cylinder in response to the radial displacement of the follower arm 25, preferably the connecting rod 50 is a semi-rigid rod. The connecting rod 50 is sufficiently rigid longitudinally to drive the piston 45 within the cylinder 42. In addition, the connecting rod 50 is sufficiently flexible laterally so that the connecting rod flexes to prevent the piston from binding in response to the transverse component of the radial motion of the follower arm 25. In the present instance, the connecting rod 50 is formed of spring wire, such as 0.050 diameter music wire. By using such a semi-rigid rod, the rod flexes laterally to prevent binding. However, the rod is also substantially stiff along its longitudinal axis, so that the rod will bow or flex rather than extending or compressing in response to the motion of the follower arm.

The terms and expressions which have been employed are used as terms of description and not of limitation. For instance, the rollers 20 and 30 can be replaced with opposing curved deflectors. The deflectors engage the faces of the mail, and the mail slides between the deflectors as the conveyor 8 transports the mail along the transport path. Accordingly, there is no intention in the use of such terms and expressions of excluding any equivalents of the features shown and described or portions thereof. It is recognized, however, that various modifications are possible within the scope and spirit of the invention as defined by the appended claims.

That which is claimed is:

1. A device for detecting the thickness of mail being conveyed along a transport path, comprising:
    a fixed roller positioned along a transport path for engaging a face of a piece of mail;
    a follower pivotable about a pivot axis;
    a follower roller rototably connected to the follower remote from the pivot axis for engaging a second face of the piece of mail, wherein the follower roller and the fixed roller form a variable width nip for receiving the mail;
    an indicator positioned relative to the follower to detect the displacement of the follower;
    a damper for dampening the displacement of the follower;
    a longitudinally elongated connecting rod having a first end rigidly connected to the follower and a second end rigidly connected to the damper, the connecting rod being sufficiently laterally flexible to allow the follower to pivot and being sufficiently stiff so that displacement of the first end displaces the second end.

2. The device of claim 1 wherein the connecting rod is substantially incompressible longitudinally.

3. The device of claim 1 wherein the connecting rod is substantially inextensible longitudinally.

4. The device of claim 1 wherein the connecting rod is formed of spring wire.

5. The device of claim 1 wherein the damper is a dashpot having a cylinder and a piston displacable within the cylinder and the second end of the connecting rod is connected to the piston.

6. The device of claim 1 wherein the indicator determines the thickness of the mail in response to the magnitude of displacement of the follower.

7. A device for detecting the thickness of mail being conveyed along a transport path, comprising:
    an engagement surface in a fixed position along the transport path for engaging a face of a piece of mail as the mail is conveyed along the transport path;
    a follower biased toward the fixed engagement surface for engaging a second face of the mail as the mail is conveyed along the transport path;
    an indicator positioned relative to the follower to detect the displacemer of the follower;
    a damper for dampening the motion of the follower; and
    a longitudinally elongated connecting rod having a first end connected to the follower and a second end connected to the damper, the connecting rod being sufficiently laterally flexible to allow lateral displacement of the follower and being sufficiently stiff so that displacement of the first end displaces the second end.

8. The device of claim 7 wherein the fixed engagement surface comprises a roller.

9. The device of claim 8 wherein the follower comprises a follower roller rotatably connected to the follower, wherein the follower roller and the fixed roller form a variable width nip for receiving the mail.

10. The device of claim 7 wherein the connecting rod is formed of spring wire.

11. The device of claim 7 wherein the connecting rod is substantially incompressible longitudinally.

12. The device of claim 7 wherein the connecting rod is substantially inextensible longitudinally.

13. The device of claim 7 wherein the damper is a dashpot having a cylinder and a piston displaceable within the cylinder and the second end of the connecting rod is connected to the piston.

14. The device of claim 7 wherein the indicator determines the thickness of the mail in response to the magnitude of displacement of the follower.

15. A device for processing mail, comprising:
    a conveyor for conveying mail along a transport path;
    a thickness detector positioned along the transport path for detecting the thickness of the mail at a plurality of points along the length of the paper as the mail is conveyed along the transport path;

a damper for dampening the motion of the thickness detector; and a longitudinally elongated connecting rod having a first end connected to the thickness detector and a second end connected to the damper, wherein the connecting rod is laterally resiliently flexible and sufficiently stiff longitudinally so that displacement of the first end displaces the second end.

16. The device of claim 15 wherein the first end of the connecting rod is rigidly connected to the thickness detector.

17. The device of claim 15 wherein the second end of the connecting rod is rigidly connected to the damper.

18. The device of claim 15 wherein the connecting rod is substantially incompressible longitudinally.

19. The device of claim 15 wherein the connecting rod is substantially inextensible longitudinally.

20. The device of claim 15 wherein the connecting rod is formed of spring wire.

21. The device of claim 15 wherein the damper is a dashpot having a cylinder and a piston displaceable within the cylinder and the second end of the connecting rod is connected to the piston.

* * * * *

UNITED STATES PATENT AND TRADEMARK OFFICE
CERTIFICATE OF CORRECTION

PATENT NO. : 6,141,883
DATED : November 7, 2001
INVENTOR(S) : Paul Mitchell

Page 1 of 1

It is certified that error appears in the above-identified patent and that said Letters Patent is hereby corrected as shown below:

Column 4, claim 7,
Line 37, "displacemer" should be -- displacement --;

Signed and Sealed this

Fifth Day of March, 2002

Attest:

JAMES E. ROGAN
Attesting Officer
Director of the United States Patent and Trademark Office